United States Patent [19]

Jördens et al.

[11] Patent Number: 5,492,415
[45] Date of Patent: Feb. 20, 1996

[54] PLAIN BEARING FOR CHASSIS PARTS IN MOTOR VEHICLES

[75] Inventors: Ernst-Günter Jördens; Helmut Kammel, both of Damme, Germany

[73] Assignee: Lemförder Metallwaren AG, Lemforde, Germany

[21] Appl. No.: 285,340

[22] Filed: Aug. 3, 1994

[30] Foreign Application Priority Data

Aug. 16, 1993 [DE] Germany ............... 43 27 474.9

[51] Int. Cl.⁶ ..................................... F16C 33/20
[52] U.S. Cl. ................. 384/125; 384/280; 384/296
[58] Field of Search ........................ 384/125, 222, 384/280, 296, 286, 294, 398

[56] References Cited

U.S. PATENT DOCUMENTS 4,290,656  9/1981  Daugherty ................. 384/286
4,558,960  12/1985  Lehtinen et al. .............. 384/398
5,062,718  11/1991  Lenhard-Backhaus et al. ..... 384/294
5,263,778  11/1993  Joerdens et al. .............. 384/296

FOREIGN PATENT DOCUMENTS 4036051  8/1991  Germany.

*Primary Examiner*—Lenard A. Footland
*Attorney, Agent, or Firm*—McGlew and Tuttle

[57] ABSTRACT

The present invention pertains to a plain bearing for chassis parts in motor vehicles, in which a sliding layer, which is made of plastic and has lubrication bore reliefs on its outer jacket, is sprayed in a firmly adhering manner onto a metallic inner part in a mold, and an elastomer body arranged in a metallic receiving bush surrounds the inner part with the sliding layer in a slidingly movable manner. Recesses, whose side wall has a profile undercut in the direction of removal from the mold, are provided on the circumference of the inner part.

7 Claims, 1 Drawing Sheet

PLAIN BEARING FOR CHASSIS PARTS IN MOTOR VEHICLES

FIELD OF THE INVENTION

The present invention pertains to a plain bearing for chassis parts in motor vehicles in which a sliding layer formed of plastic and having lubrication bore reliefs on its outer jacket, sprayed in a firmly adhering manner onto a metallic inner part in a mold, and elastomer body arranged in a metallic receiving bush, surrounds the inner part with the sliding layer in a slidingly moveable manner.

BACKGROUND OF THE INVENTION

A bearing of this type has been known from DE 40 36 051 C1. The sliding layer of this prior-art plain bearing consists of polyurethane and is connected to the inner part in a firmly adhering manner by an adhesive, which is applied to the outer surface of the inner part in a hinged, multipart mold prior to spraying the polyurethane onto the outer surface of the inner part. Relative movements between the bush-like sliding layer made of plastic and the metallic inner part are prevented as a result, especially in the direction of rotation. The inner part frequently consists of aluminum.

SUMMARY AND OBJECTS OF THE INVENTION

It is an object of the present invention to develop a design of the plain bearing, in which the costs for the adhesive and for the application of the adhesive to the inner part are eliminated.

According to the invention, a plain bearing for chassis parts in motor vehicles is provided in which a sliding layer formed of plastic and having lubrication bore reliefs on its outer jacket, is sprayed in a firmly adhering manner onto a metallic inner part in a mold. An elastomer body is arranged in a metallic receiving bush surrounding the inner part with the sliding layer in a slidingly moveable manner. Recesses are provided on the circumference of the inner part. Side walls of these recesses have a profile which is undercut in the direction of removal from the mold.

The recesses are designed as longitudinal grooves extending in an axial direction of the bearing and also as transverse grooves extending in the circumferencial direction. The cross section of the grooves forming the recesses has a dove-tailed profile provided at least on one side. The recesses on the outer circumference of the inner part and the ribs or the like located between the lubrication bore reliefs on the outer circumferences of the elastomer body are arranged offset in relation to one another, corresponding to the loads occurring during operation.

The recesses provided according to this design can be prepared e.g., in one cycle during the preparation of the inner part, so that no noticeable additional costs will arise. The introduction of the adhesive and the costs for the adhesive are eliminated. The adhesive connection between the inner part and the material of the sliding layer is improved mainly by the positive-locking mutual engagement.

The recesses are advantageously prepared as longitudinal grooves extending in the axial direction of the bearing and as transverse grooves extending in the circumferential direction, and the cross section of these grooves has a dovetail profile at least on one side.

It becomes possible to specifically influence the rigidity of the elastomer body by arranging the recesses in a peripherally offset pattern, in a partially offset pattern, or overlapping with the ribs or the like forming the lubrication bore reliefs on the outer circumference of the elastomer body.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
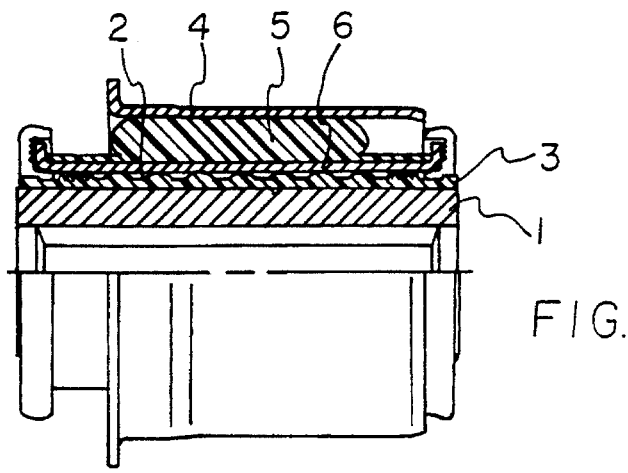
FIG. 1 is a partially sectional view of a plain bearing, half as a side view and half as a section in an axial plane.

In the plain bearing corresponding to the representation in FIG. 1, a bush-like sliding layer 3 is provided made of polyurethane or another suitable plastic. The sliding layer 3 has lubrication bore reliefs 2 on its outer jacket and is sprayed on in a firmly adhering manner in a form. The sliding layer 3 is applied to an inner part 1 consisting of aluminum. An elastomer body 5 arranged in a metallic receiving bush 4 surrounds an outer bush 6 and is also arranged thereon in a firmly adhering manner. The inner part 1 with the sliding layer 3 arranged on it is inserted into the outer bush 6 in a slidingly movable manner. Further design details, which are insignificant for the present invention, will become apparent from the drawing.

The firmly adhering connection between the sliding layer 3 and the outer jacket of the inner part 1 is achieved by recesses 7 on the circumference of the inner part 1 according to the representations in FIGS. 2 through 5. The recesses 7 are designed, corresponding to the representation in FIGS. 4 and 5, as longitudinal grooves extending in the axial direction of the plain bearing and as transverse grooves extending in the circumferential direction of the plain bearing. As is shown in the cross-sectional representation in FIG. 5, the recesses 7 are undercut on one side at least in the direction in which the mold is opened during the removal from the mold of the polyurethane of the sliding layer, which was applied according to the spraying process. The preferred profile of the grooves forming the recess is the dovetail profile. It is achieved as a result that the material of the sliding layer will not be lifted off from the surface of the inner part during the opening of the mold. This design makes it possible to eliminate an adhesive between the material of the sliding layer and the inner part. Other profiling of the recesses, which apply the features of the present invention, are conceivable.

Figure 2:
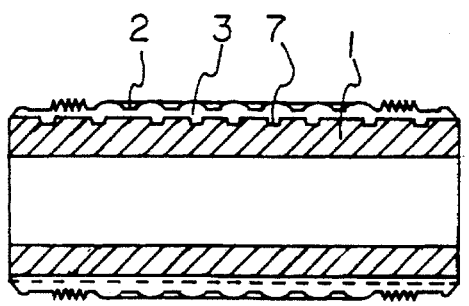
FIG. 2 is a sectional view of the inner part with the sliding layer applied to it, in an axial plane.
Figure 4:
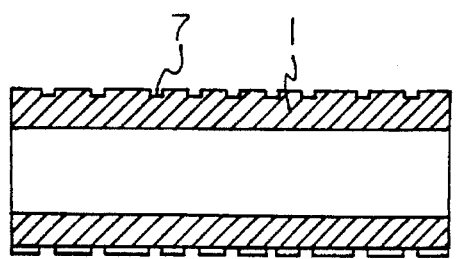
FIG. 4 is a sectional view of the inner part in an axial plane on the scale of FIG. 2.
Figure 3:
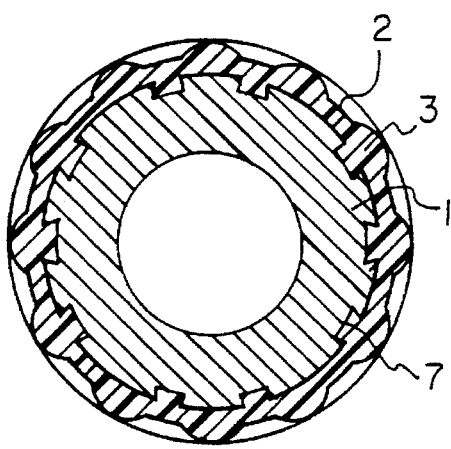
FIG. 3 is a cross sectional view of the design according to FIG. 2 on a larger scale.
Figure 5:
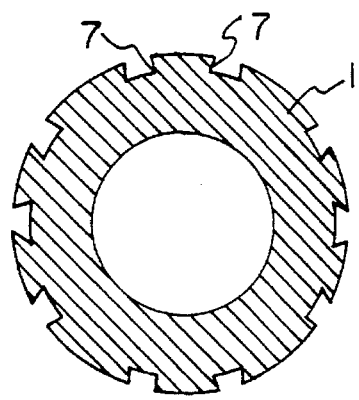
FIG. 5 is a cross sectional view of the inner part on a scale larger than that of FIG. 4.

According to the exemplary embodiments represented in FIGS. 2 and 3, it is possible to influence the rigidity of the elastomer body 5 by arranging the recesses 7 in a specifically offset pattern on the outer circumference of the inner part in relation to the ribs between the lubrication bore reliefs 2, corresponding to the principal loads occurring during the operation of the plain bearing.

While a specific embodiment of the invention has been shown and described in detail to illustrate the application of the principles of the invention, it will be understood that the invention may be embodied otherwise without departing from such principles.

What is claimed is:

1. A plain bearing for chassis parts in motor vehicles, comprising:
   - a metallic inner part, said metallic inner part having a surface with recesses provided on the circumference thereof, each recess having a sidewall with an undercut profile;
   - a sliding layer formed of plastic, said sliding layer having lubrication bore reliefs on an outer jacket, said sliding layer being formed by spraying plastic material on said metallic inner part in a mold, said profile undercut of each of said recesses being in a direction to prevent removal of said sliding layer upon opening of said mold and removal of said metallic inner part;
   - a metallic receiving bush; and
   - and elastomer body arranged in said metallic receiving bush, said metallic receiving bush surrounding said inner part and engaging said sliding layer in a slidingly moveable manner.

2. A plan bearing accordingly to claim 1, wherein said recesses are designed as longitudinal grooves extending in an axial direction of the bearing and as transverse grooves extending in a circumferencial direction of the bearing.

3. A plain bearing according to claim 2, wherein said recesses on said outer circumference of said inner part and ribs defined between said lubrication bore reliefs of said outer circumference of an outer surface of said sliding layer are arranged offset in relation to one another, corresponding to loads occurring during operation.

4. A plain bearing according to claim 2, wherein said cross-section of said grooves forming said recesses has a dove-tailed profile provided at least on one side.

5. A plain bearing according to claim 1, wherein said recesses on said outer circumference of said inner part and ribs defined between said lubrication bore reliefs of said outer circumference of an outer surface of said sliding layer are arranged offset in relation to one another, corresponding to loads occurring during operation.

6. A plain bearing according to claim 1, wherein said cross-section of said grooves forming said recesses has a dove-tailed profile provided at least on one side.

7. A plain bearing according to claim 6, wherein said recesses on said outer circumference of said inner part and ribs defined between said lubrication bore reliefs of said outer circumference of an outer surface of said sliding layer are arranged offset in relation to one another, corresponding to loads occurring during operation.

* * * * *